United States Patent
Andersson

(10) Patent No.: US 9,423,164 B2
(45) Date of Patent: Aug. 23, 2016

(54) METHOD AND APPARATUS FOR THE DEFROSTING OF AN EVAPORATOR IN CONNECTION WITH AN AIR HANDLING UNIT

(71) Applicant: FLÄKT WOODS AB, Jönköping (SE)

(72) Inventor: Johan Andersson, Huskvarna (SE)

(73) Assignee: FLÄKT WOODS AB, Jönköping (SE)

( * ) Notice: Subject to any disclaimer, the term of this patent is extended or adjusted under 35 U.S.C. 154(b) by 0 days.

(21) Appl. No.: 14/441,347

(22) PCT Filed: Dec. 3, 2013

(86) PCT No.: PCT/SE2013/051440
§ 371 (c)(1),
(2) Date: May 7, 2015

(87) PCT Pub. No.: WO2014/098724
PCT Pub. Date: Jun. 26, 2014

(65) Prior Publication Data
US 2015/0292786 A1    Oct. 15, 2015

(30) Foreign Application Priority Data
Dec. 21, 2012    (SE) ....................................... 1200784

(51) Int. Cl.
*F25B 41/00*    (2006.01)
*F25B 47/02*    (2006.01)
(Continued)

(52) U.S. Cl.
CPC ............. *F25B 47/025* (2013.01); *F24F 12/003* (2013.01); *F25B 47/022* (2013.01);
(Continued)

(58) Field of Classification Search
CPC ...... F25B 47/025; F25B 47/022; F25B 13/00; F25B 2341/0662; F25B 2400/0411; F24F 12/003; F24F 2011/0087; F25D 21/06; Y02B 30/52; Y02B 30/563
See application file for complete search history.

(56) References Cited

U.S. PATENT DOCUMENTS

| 4,770,000 A * | 9/1988 | Kuroda ................... F25B 13/00 62/156 |
| 5,309,725 A | 5/1994 | Cayce |

(Continued)

FOREIGN PATENT DOCUMENTS

| GB | 1 556 064 | 11/1979 |
| GB | 2 206 679 A | 1/1989 |

(Continued)

OTHER PUBLICATIONS

International Search Report Corresponding to PCT/SE2013/051440 mailed Apr. 17, 2014.
(Continued)

*Primary Examiner* — Jonathan Bradford
*Assistant Examiner* — Elizabeth Martin
(74) *Attorney, Agent, or Firm* — Davis & Bujold PLLC; Michael J. Bujold

(57) ABSTRACT

Method and device for defrosting of an evaporator (1) in a heat pump (2) connected to an air handling unit (9), which comprises a controllable heat recovery device (10). The heat pump (2) comprises a refrigerant system (3) with a refrigerant (4), a compressor (5), a condenser (6), a first expansion valve (7) and an evaporator (1). A four-way valve (8) is arranged after the compressor (5) and before the condenser (6), for changing a flow direction of the refrigerant (4) to the evaporator (1) instead of the condenser (6). The heat recovery device (10) recovers energy from first air stream (11) and transfer energy to second air stream (12). When frost formation occurs, the refrigerant temperature is increased and the recovery device (10) is regulated down so that heating of the evaporator (1) is accomplished, both from inside and outside to defrost the evaporator (1).

9 Claims, 3 Drawing Sheets

(51) Int. Cl.
*F24F 12/00* (2006.01)
*F25D 21/06* (2006.01)
*F25B 13/00* (2006.01)
*F24F 11/00* (2006.01)

(52) U.S. Cl.
CPC ........ *F25D 21/06* (2013.01); *F24F 2011/0087* (2013.01); *F24F 2203/104* (2013.01); *F25B 13/00* (2013.01); *F25B 2341/0662* (2013.01); *F25B 2400/0411* (2013.01); *Y02B 30/52* (2013.01); *Y02B 30/563* (2013.01)

(56) References Cited

U.S. PATENT DOCUMENTS

| | | |
|---|---|---|
| 6,141,979 A | 11/2000 | Dunlap |
| 6,442,951 B1 * | 9/2002 | Maeda .................. F24F 3/1423 62/271 |
| 2004/0244398 A1 | 12/2004 | Radermacher et al. |
| 2008/0108295 A1 | 5/2008 | Fischer et al. |
| 2009/0266093 A1 * | 10/2009 | Aoki ..................... F25B 47/025 62/155 |
| 2009/0277207 A1 * | 11/2009 | Park ........................ F25B 13/00 62/324.6 |
| 2011/0197605 A1 * | 8/2011 | Suzuki ............... B60H 1/00335 62/140 |
| 2011/0308265 A1 * | 12/2011 | Phannavong ......... F24F 12/001 62/160 |
| 2012/0180505 A1 | 7/2012 | Gerber et al. |
| 2012/0180982 A1 * | 7/2012 | Gerber ..................... F24D 5/12 165/59 |

FOREIGN PATENT DOCUMENTS

| | | |
|---|---|---|
| WO | 01/84066 A1 | 11/2001 |
| WO | 2007/141901 A1 | 12/2007 |
| WO | 2008/091109 A1 | 7/2008 |
| WO | 2013/081532 A1 | 6/2013 |

OTHER PUBLICATIONS

Written Opinion Corresponding to PCT/SE2013/051440 mailed Apr. 17, 2014.
International Preliminary Report on Patentability Corresponding to PCT/SE2013/051440 mailed Apr. 27, 2015.

* cited by examiner

METHOD AND APPARATUS FOR THE DEFROSTING OF AN EVAPORATOR IN CONNECTION WITH AN AIR HANDLING UNIT

TECHNICAL FIELD

Present invention relates to a method and a apparatus for defrosting of an evaporator in a heat pump installation in connection with an air handling unit, which air handling unit comprises some kind of heat recovery of the energy from the exhaust air, for example from a building.

BACKGROUND OF THE INVENTION

Within the field of air handling it is common to equip an air handling unit with some kind of heat recovery device to recover energy from the heated exhaust air and transfer this energy to the supply air, in case of a heating demand of the supply air. The opposite, to cool down the supply air in case of the exhaust air is colder than the outdoor air, is also a common task of the heat recovery device. Irrespective of the type of heat recovery it is common with some kind of after-treatment of the supply air, for example a heating coil and/or a cooling coil for controlling the supply air temperature to a wanted value, a so called set point, despite the outdoor air temperature.

The state of the art also presents heat pump solutions in connection with air handling units, and these are called for example Heat Pumps, Coolers and the like, depending of if the main function is heating, cooling or heat recovering. Practically, the placement of the heat pump is in connection to or in the air handling unit, and the heat pump comprises a refrigerant circuit with a heat transfer medium/a refrigerant of some kind, an evaporator, a condenser, as well as a compressor and an expansion valve. The heat pump can be designed with a so called reversible refrigerant circuit which means that a multi-way valve can, if necessary, change the flow direction of the refrigerant to the opposite compared to the normal flow direction. In connection to an air handling unit, a so called direct expansion coil is placed—a DX-coil—in the supply air and one DX-coil in the extract air, i.e. in the exhaust air, in the flow direction after the heat exchanger, thus in the air ready to be released into the open air. These DX-coils represents evaporator or condenser, depending on the flow direction in which the refrigerant is pumped in the system. DX-coils typically consist of a number of copper tubes with aluminum fins where the refrigerant passes through the copper tubes and heat is emitted or absorbed through the exchange with the ambient air passing through the DX-coil. The aluminum fins increases the heat transfer surface of the DX-coil.

The general function of the heat pump process is such that the heat content of a medium, such as air, is moved from a location where the heat can be collected, to another location where there is a heat demand and where heat can be emitted. The heat pump process works in that the refrigerant in the system transfer from high pressure to a significant lower pressure when passing an expansion valve, which also means that the temperature of the refrigerant drops radically. The refrigerant then passes the evaporator where it evaporates due to heat absorption from the ambient medium, such as outdoor air, or like in this case the exhaust air/extract air from an air handling unit. The steam then passes the compressor where it is compressed to once again obtain a high pressure, while the temperature increases during compression, and in most cases, compressor heat is recovered and transferred to the refrigerant as well. Then the refrigerant is sent, in the form of heated high pressure steam, on to the condenser, where the high-pressure steam condenses and becomes liquid. During this process, the condenser releases heat, and it is this heat, along with any compressor heat that is used for heating the heating side. Thereafter the refrigerant is sent to the expansion valve, and the heat pump cycle is thus closed. When the circuit is used for cooling in an air handling unit, the process runs simply reversibly, that is, the refrigerant is sent in the other direction in the system, wherein each DX-coil so to say shifts, so that the evaporation takes place instead into the supply air, which is then cooled, while condensation occurs into the exhaust air/extract air.

When these systems operates, a need to defrost of the evaporator arises every now and then, because the evaporator side DX-coil is cooled down rapidly, both because of the evaporation process itself, with very cold refrigerant in the evaporator, and that the evaporator is exposed to cold and often damp air that passes through the evaporator/DX-coil. This applies especially in the heating case, that is, when heat is absorbed from the exhaust air/extract air and transferred to the supply air for heating the same. The result of this is that heavy icing may occur in the evaporator unless defrost. Using the heat pump process in a cooling mode, and in connection with an air handling unit, is relatively common and sometimes also when the unit has a heat exchanger. Due to the above described icing problems there are no known solutions with combinations of heat exchanger and heat pump for heating applications, and with effective and useful defrosting technique, because no one has figured out a good enough defrosting technique of the evaporator. It simply costs too much energy and the supply air temperature fluctuates due to the defrosting sequence (cooling of the supply air during defrost despite heating demand). By that the air handling unit comprises a heat exchanger which, by heating is regulated for maximum heat recovery from exhaust air, it follows that the temperature after heat recovery and before the evaporator is cold. The combination of this, along with cold refrigerant within the evaporator, increases the risk of ice formation on the evaporator and heavy icing can occur as stated. According to conventional methods in most types of heat pumps, the defrosting operation is conducted by that the refrigerant circuit is driven reversibly, by arranging a multi-way valve or the like, in the refrigerant circuit, which valve, at a defrosting demand, turns the refrigerant flow direction, wherein warm refrigerant is sent to the evaporator, instead of the condenser, during an appropriate time to make the ice melt and the DX-coil is thereby heated from the inside with the refrigerant. The control of this constitutes either a timer controlled defrosting sequence where the sequence is repeated according to preset intervals or either by a frost guard indicating when icing occurs, where after the defrosting sequence starts. In these cases the defrosting is conducted according to on/off-principal, i.e. either defrosting in progress or not in progress, and the defrosting in progress is conducted according to a certain time or until the system indicates that the ice formation is gone.

In other heat pump applications, like a conventional air/air heat pump or a cooler, the placing of the evaporator is separate out in the outdoor air, on a roof or on a wall or the like. The evaporator in these applications is often equipped with a fan which blows or sucks air through the evaporator. During defrosting the refrigerant circuit is reversed at the same time as the fan is shut off so as not to cause an extension of the defrost cycle, if the ambient air is cold. Within the field of ventilation the conditions is somewhat different when the air handling fans must run continuously, even during defrosting of the evaporator, due to ventilation requirements. This effect the defrosting cycle time, which is extended, and the building, which is ventilated by means of air handling unit, must be ventilated during the time of defrosting. The longer the defrosting cycle time takes the more energy is lost, along with that the supply air temperature gets colder, and this is a problem that led to the use of heat pump solutions for heating of the supply air is rare. Cooling by heat pump is, as mentioned above, however, relatively common because then there is usually not the same problem, as the evaporator is set to never get colder than, say, +15° C., as you very rarely can allow a supply air temperature colder than this.

When an air handling unit with a heat pump solution is run in heating mode, i.e. during the cold season of the year, occurs as told, continuously the need of defrosting during operation. On the supply air side in the field of ventilation, there is another disadvantage as mentioned above, namely, the temperature demand on the supply air, which is not a problem in other heat pumps arranged for heating, where the ventilation demand is not at hand. By reversible operation as defrosting technique, the respective DX-coil changes, at least eventually, from evaporator side to condenser side and vice versa, so to speak. The DX-coil placed in the supply air after the heat exchanger, is normally in heating case the final heating unit, for heating the supply air to the set value, after the heat exchanger has transferred heat to the supply air. The DX-coil of the supply air side constitutes thus condenser in the heating case, but at defrosting of the evaporator (in extract air) by reversible operation, the supply air DX-coil becomes the cold side. While ventilation cannot be shut off it means that the supply air eventually cools down, despite the need of heat. The supply air temperature cannot be kept constant in other way than installing an extra heating battery in the supply air. It is desirable that the time of defrosting is minimized, precisely because of these unique disadvantages within the field of ventilation.

The problem with prior art is that the defrosting sequence is considerably time consuming, while the controlled defrosting takes place unilaterally, from the inside of the evaporator by heating the refrigerant. Furthermore, the heat recovery operates parallel to defrosting, which itself cools the air passing the evaporator and thereby extends the defrosting time, and that both supply air fans and exhaust air fans have to run continuously.

SUMMARY OF THE INVENTION

With the present invention the object is achieved to solve the above problems, by the first aspect of the invention with the invented method to defrost the evaporator by simultaneously heating the same, both from the inside and the outside. This is achieved by raising the temperature of the refrigerant through the evaporator and thereby heat the evaporator from the inside, at the same as down regulating the heat recovery device in the air handling unit. By reducing the heat recovery during defrost, the temperature of the air after the heat exchanger rises, i.e. before the evaporator, and the air passing through the evaporator is heating the same from the outside. With the invented method the time of defrosting is reduced in compared to older solutions with unilateral defrosting and a more stable supply air temperature is achieved at the same time as the defrosting, if desired, may take place earlier in the frosting stadium, and also in small, shorter sequences to provide a more uniform supply air temperature.

According to a preferred embodiment of the invented method, the temperature of the refrigerant is raised during defrosting, by that the heat pump is operated reversibly, that is the refrigerant is pumped in the opposite direction in the refrigerant system compared to the normal direction for heating mode. This is done by a four-way valve which switches the flow direction so that the heated high-pressure steam after the compressor is sent to the evaporator instead of into the condenser, without passing through the expansion valve. In that way the evaporator, that is the DX-coil, in the first air stream, is heated both from the inside by the heated refrigerant and also from the outside through the down regulation of the heat recovery device, allowing the first air stream getting warmer than before, warmer than the operating mode causing the frost of the evaporator. This will shorten the defrost time significantly compared to older solutions.

According to another preferred embodiment of the method, the refrigerant circuit comprises a so called hot gas valve, which is arranged in the flow direction after the compressor as a bypass to the refrigerant tube after the expansion valve. By this valve it becomes possible to send the heated high pressure steam after the compressor directly to the evaporator, without passing the expansion valve or the four-way valve. Via the hot gas valve, all or a portion of the steam is sent to the evaporator and, where appropriate, the remaining subset is sent via the four-way valve to the condenser, as usual. The amount of heated hot gas steam that is sent directly to the evaporator, heats the same from the inside, while the heat recovery device is down-regulated and provides heating from the outside of the evaporator tubes.

In the immediately above described embodiment of the inventive method the energy will eventually only consist of the supplied compressor heat. According to a further preferred method the above is combined with that the compressor speed is increased while the hot gas valve opens limited. This increases the temperature of the evaporator sufficiently enough to stop the icing and melt the ice, while the supply air is heated and the supply air temperature is more stable than conventional reversible operation where, so to speak, the condenser ceases to warm the supply air during defrosting. With this method the condenser continues to supply thermal energy even during defrosting.

An alternative way to achieve a temperature rise of the refrigerant during defrost is that the cooling power is reduced by reducing the compressor speed so that the cooling power of the evaporator decreases. In this way the temperature of the refrigerant through the evaporator becomes higher, and this combined with, as previously described, down-regulation of the heat recovery device, a double defrosting is obtained, from the inside and from the outside.

To determine the most appropriate way to control defrosting by any of the methods described above, to achieve the double-sided defrost of the evaporator, according to a preferred embodiment, the temperature is measured between the heat recovery device and the evaporator. Guided by this temperature the defrost is controlled to, for example run the refrigerant circuit reversible via the four-way valve, that is, send the hot gas in the opposite direction to the evaporator instead of into the condenser, alternatively allow a subset of the hot gas to be sent to the evaporator and condenser respectively, or reduce the cooling power in the evaporator by down-regulating the compressor speed, or if the installation includes a hot gas valve, send all or a subset of the hot gas to the evaporator and condenser respectively. Especially provides temperature control in combination with an installation comprising both a four-way valve and a hot gas valve, a very good flexibility in choosing of defrosting method, which in the field of ventilation not previously have been obtained.

In a further preferred embodiment of the method the heat pump also comprises a reservoir and a second expansion valve, which are arranged between the first expansion valve and the condenser. Preferably both expansion valves are electronic and thus easily controllable. The first expansion valve controls refrigerant flow to the evaporator and the second expansion valve controls the refrigerant level in the reservoir, in interaction with the first valve, for obtaining a controlled so called superheating. Superheating is defined by measuring the pressure before the compressor and then calculate the theoretical temperature of the refrigerant and also measure the surface temperature of the pipe, before the compressor. The theoretical temperature is compared with the measured temperature of the pipe and the difference between them is defined as the superheating. If superheat is lower than the preset so-called set point, the second expansion valve throttles the refrigerant flow slightly, which leads to that superheating will rise. If superheating instead is higher than the set point the second expansion valve opens slightly, and the superheat drops. The reservoir acts as a buffer for the refrigerant when the consumption/need of refrigerant varies for different temperatures. The advantage of the heat pump comprising a reservoir and a second expansion valve is, apart from the direct regulating advantages of a refrigerant buffer in the reservoir, that the superheating can be regulated/balanced with regard to which of the above described defrosting techniques that is used. Hereby is obtained a controlled amount of refrigerant for operating mode and a balanced counter pressure in the condenser also at a partial load of the compressor. In all cases the invention concept is achieved, with double-sided defrosting of the evaporator through heated refrigerant and by heated through flowing exhaust air/extract air.

An alternative to balancing the superheating according to any of the above described defrosting techniques is, according to a preferred embodiment of the method, by using the superheating as defrosting. By down-regulating the speed of the compressor and in combination with that the first expansion valve throttles refrigerant flow, the superheating increases. This process is advantageously used to make quick and short defrosting cycles and preferably in an early stage of icing in the evaporator. The increased superheating heats the refrigerant in the evaporator whereby defrosting is performed from the interior of the evaporator, and in combination with reduced heat recovery, the defrosting of the evaporator is performed from the outside because of the slightly raised temperature of the air after the heat recovery. This type of heat pump solution in conjunction with the ventilation system is not previously known, and the benefits versus conventional technique are plenty, because the defrosting technique both is more flexible than older solutions, both depending on the number of expansion valves, the refrigerant reservoir and the ability to control defrosting, for example for quick and short defrost cycles in the early icing stage, i.e. by raised superheating, or in combination with other of the ways described above to provide the double-sided defrost.

From the second aspect of the invention, the object is achieved by a device, of the kind specified in the beginning, which has the special feature that the heat pump comprises a hot gas valve, which is disposed after the compressor, seen from the flow direction of the refrigerant. By that the device comprises a hot gas valve it becomes possible that, instead of like in conventional application run with fully reversible operation, instead let warm high pressure steam be sent directly to the evaporator to defrost the same, without the steam passing the expansion valve. Via the hot gas valve, all or a portion of the steam is sent to the evaporator and, where appropriate, the remaining subset is sent via the four-way valve to the condenser, as usual. The amount of heated high-pressure steam that is sent directly to the evaporator, heats the same from the inside, while the heat exchanger is down-regulated and provides heating from the outside of the evaporator tubes, whereby the invention is utilized. By taking advantage of the opportunity to send a subset of the heated high-pressure steam via the hot gas valve to the evaporator and let the rest go to the condenser via the four-way valve, it is still possible to heat the incoming air with condenser energy although defrost operation of the evaporator. This possibility does not exist in older applications as only reversible operation does not allow this option. The result of the possibility to heat incoming air with condenser energy, is that the supply air temperature overall is much more stable, because that the condenser so to speak, not becomes the "cold side" during defrosting as in older solutions.

According to a preferred embodiment of the device, the heat pump comprises also a reservoir and a second expansion valve, which are arranged between the first expansion valve and the condenser. Preferably, both expansion valves are electronic and thereby controllable. The first expansion valve is arranged to control the flow of refrigerant to the evaporator and the second expansion valve is arranged to control level of the refrigerant in the reservoir, in cooperation with the first valve, to achieve a controlled amount of refrigerant and a balanced counter pressure in the condenser also at a partial load of the compressor. The reservoir acts as a buffer for the refrigerant when the consumption/need of refrigerant varies for different temperatures. The advantage of the heat pump comprising a reservoir and a second expansion valve is, apart from the direct regulating advantages of a refrigerant buffer in the reservoir, that the superheating can be regulated/balanced with regard to which defrosting technique that is used. Whichever defrosting technique used according to the invention, good flexibility is obtained in all cases and the invention concept is achieved, with double-sided defrosting of the evaporator through heated refrigerant and by heated through flowing exhaust air/extract air.

According to a further preferred embodiment the device comprises a temperature sensor, which is arranged between the heat recovery device and the evaporator. The temperature is measured here in between to decide the most appropriate way of defrosting according to any of the preferred embodiments of the method, and by that achieve the double-sided defrost of the evaporator, according to demand and appropriate method for the actual running mode. Guided by this temperature the defrosting is controlled for example according to purely reversible operation via the four-way valve, i.e. sending the refrigerant in the opposite direction to the evaporator instead of to the condenser, alternatively letting a portion of the refrigerant to be sent to the evaporator and the condenser respectively, by means of the hot gas valve, or decrease the cooling power in the evaporator by down-regulating the compressor speed. Especially the temperature control in combination with a facility comprising both a four-way valve and a hot gas valve, provides a very high flexibility in choosing defrosting method, which within the field of ventilation not previously has been possible.

According to a preferred embodiment of the device the heat pump comprises a flash tank, which is arranged in the flow direction of the refrigerant before the compressor but after the four-way valve. To achieve the best performance of the heat pump system one tries to inject as much refrigerant as possible in the evaporator without any refrigerant exits the evaporator as a fluid. Furthermore, the compressor is very sensitive to fluid and for these reasons it is advantageous with a tank in the form of a flash tank before the compressor. This provides both a buffer of refrigerant for the optimization of the operation as well as a security against any liquid reaches the compressor. By external circumstances, i.e. rapidly changing conditions, instability can occur and thereby lead to that liquid may come out of the evaporator. This may also occur if for example the refrigerant circuit is turned without stopping the compressor or at a quick stop of the ventilation system. By the flash tank, any liquid coming out of the evaporator is intercepted before it reaches the compressor. Hereby a higher grade of compressor security is achieved and the operation of the facility during the special conditions that are at hand at heat pump installations for heating supply air in air handling units.

By the invention a number of advantages are achieved compared to prior art solutions:
  Double-sided defrosting of the evaporator which gives a quicker defrosting cycle and a more stable supply temperature.
  Even during ongoing defrosting it is possible to continuously heat the supply air in the air handling unit via the condenser whereby the supply air temperature becomes more stable.
  A great flexibility regarding choice of defrost method through configurations including four-way valve, hot gas valve, double expansion valves which preferably are of electronic type, reservoir for controlling and buffering of refrigerant and also a possibility to control the superheat.

BRIEF DESCRIPTION OF THE DRAWINGS

Below schematic principal figures shows.

The constructive design of the present invention are apparent in the following detailed description of an exemplary embodiment of the invention with reference to the accompanying figures which show a preferred but not limiting embodiment of the invention.

DETAILED DESCRIPTION OF THE DRAWINGS

Figure 1:
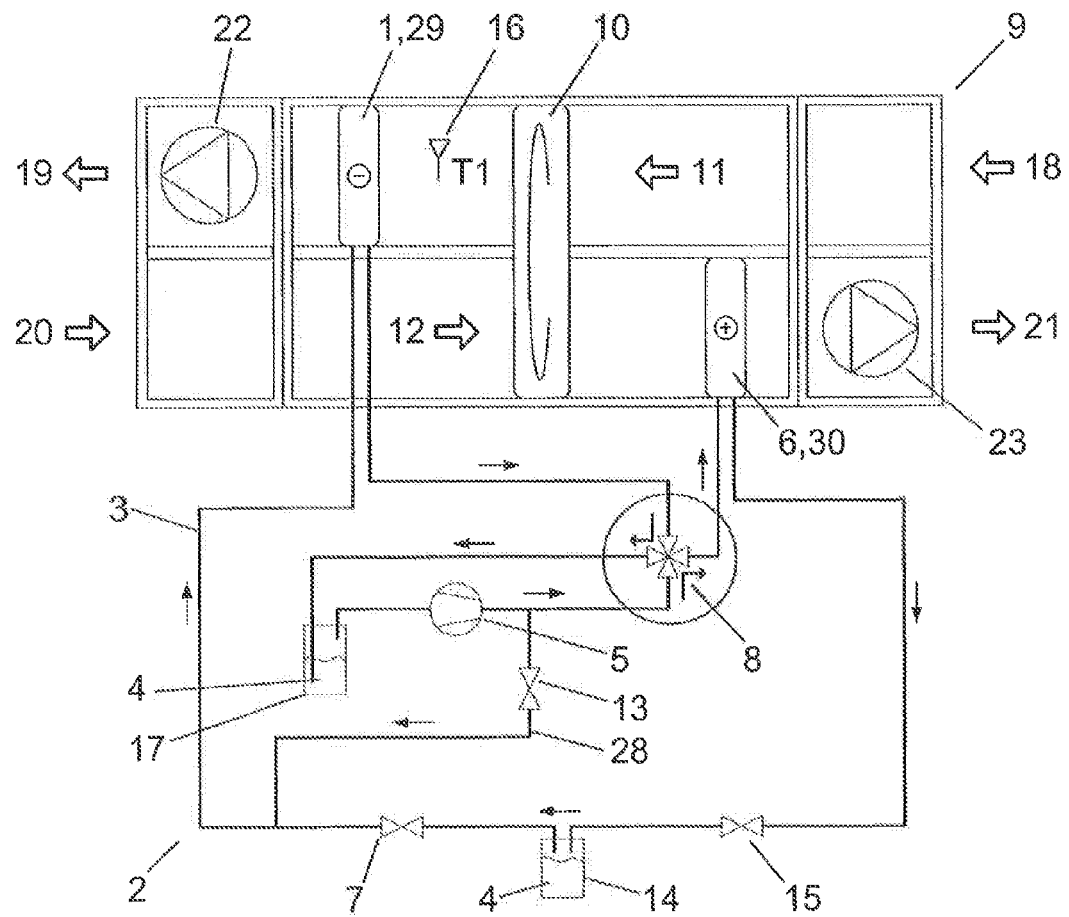
FIG. 1 shows a principal layout of the heat pump according to the invention, arranged in connection to a air handling unit comprising a heat recovery device, and running in normal mode for heating of the supply air.
Figure 1:
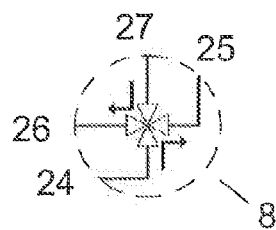

FIG. 1 shows a principal layout of a preferred embodiment of a heat pump 2 according to the invention, arranged as a part of an air handling unit 9. It should be understood that the functions as well can be arranged as an entire unit module or a number of smaller modules joining to an air handling unit 9. Besides, should also be mentioned that the air handling unit 9 also includes other components which are not shown in the figures, such as filters, any other heaters and coolers, sensors etc. According to the embodiment shown in the figure a first air stream 11 is arranged in the upper half of the complete air handling unit 9, and in the flow direction of the first air stream 11, in the figure from right to left, the first air stream 11 comprises exhaust air 18 for example from a room, apartment or the like. Usually the exhaust air 18 passes a filter (not shown) before it reaches a heat recovery device 10. According to the preferred embodiment it is a controllable rotating heat recovery device 10. Then the first air stream 11 passes an evaporator 1, which is constituted by a first DX-coil 29, and then the air passes an exhaust fan 22, which drives the first air stream 11. Then the air leaves the air handling unit 9 and is thereby named extract air 19, which is released in the open air outside the building. In the lower part of the air handling unit 9 there is a second air stream 12, and in succession from left to right in the figure, outdoor air 20 which is sucked into the air handling unit 9. The outdoor air 20 passes normally a filter (not shown) before it reaches the heat recovery device 10. Then the second air stream 12 reaches a condenser 6, which consist of a second DX-coil 30, and thereafter the air passes a supply fan 23, which drives the second air stream 12 through the air handling unit 9 and further into the premises. After the supply fan 23 the air normally is named supply air 21.

The heat pump 2, in turn comprises a refrigerant system 3 with a refrigerant 4, and at normal operation of the heating case, the following components are included, all of course connected with conduits, in order as follows. First a compressor 5, followed by a four-way valve 8 with a first inlet 24, arranged for the inflow of refrigerant 4 from the compressor 5, further a first outlet 25 for the outflow of refrigerant 4 to the condenser 6, and a second outlet 26, for reflow of refrigerant 4 I direction to the compressor 5. Thus, there is a flash tank 17 between the second outlet 26 and the compressor 5, which flash tank 17 is arranged to separate eventual fluid refrigerant 4, to only let gaseous refrigerant 4 reach the compressor 5. The compressor 5 is very sensitive to fluid and to reach best performance in the system, one tries to inject a maximal amount of refrigerant 4 into the evaporator 1 without any refrigerant 4 exits the evaporator 1 as a fluid. By external circumstances, i.e. rapidly changing conditions, instability can occur in the system and thereby lead to that liquid may come out of the evaporator 1. This may also occur if the refrigerant circuit is turned without stopping the compressor 5. By the flash tank 17, any liquid coming out of the evaporator 1 is intercepted before it reaches the compressor 5. After the first outlet 25 of the four-way valve 8, follows as said the condenser 6/the second DX-coil 30, further thereafter in the flow direction, a second expansion valve 15 followed by a reservoir 14, arranged as a buffer for refrigerant 4 in the refrigerant system 3. While the cooling circuit works under different operation circumstances, different amounts of refrigerant 4 is needed in the system and the different needs of refrigerant 4 is buffered, according to the preferred embodiment in the reservoir 14 instead of the condenser 6, which otherwise is normal. Further in the flow direction follows, after the reservoir 14, a first expansion valve 7, followed by the evaporator 1/the first DX-coil 29 and after this, the heat pump cycle is closed by that the evaporator 1 outlet connects to a second inlet 27 of the four-way valve 8. In addition to this there is a so called bypass 28 for the refrigerant 4, which is arranged to send heated high pressure steam directly to the compressor 5, through a hot gas valve 13, to the evaporator 1, without passing the first expansion valve 7 or the second expansion valve 15.

Function Heating Operation

During times when heating is required primarily the heat recovery device 10 is fully used to recover heat energy from the exhaust air 18 to heat the supply air 21. According to the example in FIG. 2 the controllable rotating heat recovery device 10 runs with maximum speed for maximum heat recovery. Thus the temperature T1 after the heat recovery device 10 becomes low and often the exhaust air 18 also contains some moisture. Temperature T1 is measured by a temperature sensor 16, which is positioned after the heat recovery device 10, in the flow direction of the first air stream 11. When the capacity of the heat recovery device 10 is not enough, additional heat must be added to the supply air 21, and according to the invention with help of the heat pump 2. Hereby energy is supplied to the compressor 5 to drive the heat pump process and recover additional heat from the exhaust air 18, via the evaporator 1, and transfer this heat to the supply air 21, via the condenser 6. The compressor 5 normally regulates towards the preset value of the supply air 21 temperature and the heating power from the condenser 6 follows the compressor 5 speed. In the condenser 6, i.e. in the second DX-coil 30, positioned in the supply air 21, both the compressor heat and the condenser heat is delivered to the supply air 21. The cooling capacity is delivered in the evaporator 1, i.e. the first DX-coil 29, positioned in the extract air 19, and follows the extract air 19 out into the free. The latter is the same as heat recovery from the exhaust air 18 and thus cooling the extract air 19. During the heat mode the hot gas valve 13 is completely closed, while the second expansion valve 15 is completely opened and the first expansion valve 7 controls the flow of refrigerant over the evaporator 1 and regulates towards the so called superheat, described above. The superheat preferably is around 4-8 K for optimal operation. When the temperature T1, between the heat recovery device 10 and the evaporator 1, drops down to 2-4° C., ice formation will occur within the evaporator 1. When ice formation is started and how heavy it will become, is depending on air temperature, air humidity and cooling power in the evaporator 1. Hereby the demand for defrost occurs, which can be done in different ways as below.

Soft Defrost

In cases where icing is in its initial stage or when conditions are such that there is sufficient with short defrosting sequences to keep icing away, it is possible that as an alternative method to reduce the cooling capacity of the evaporator 1 by reducing compressor 5 speed while throttling the second expansion valve 15, which increases superheat. Because the passing first air stream 11/exhaust air 18 is not cold down as much as at the icing conditions, because of the reduced cooling capacity and also that that the refrigerant 4 is heated by increased superheat, a double-sided defrost of the evaporator 1 is achieved, and this method is appropriate for quick and repeated defrost cycles.

Figure 2:
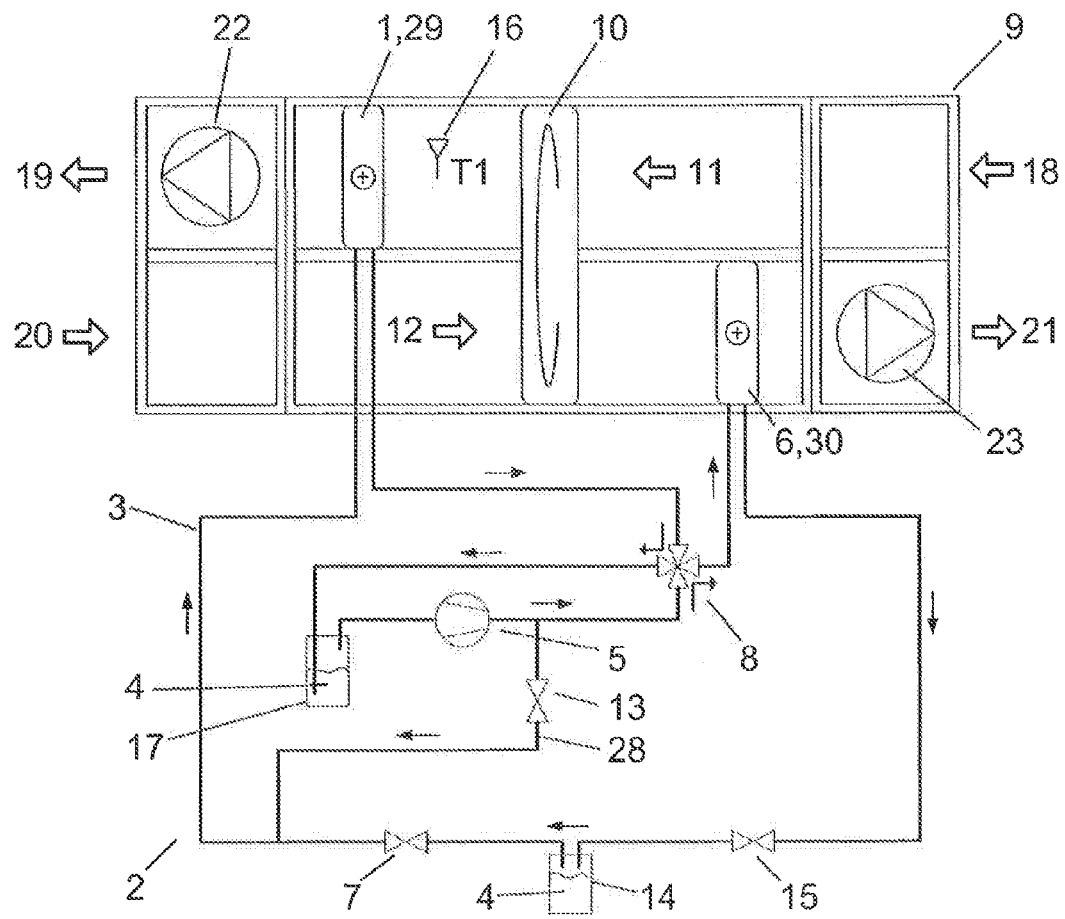
FIG. 2 shows a principal layout of the heat pump according to the invention during simultaneous defrost of the evaporator and heating through the condenser, using among other the hot gas valve.

FIG. 2 shows a preferred embodiment of the invention where the hot gas valve 13 is used for defrosting the evaporator 1, according to description below.

Hot Gas Defrost

When icing is indicated in the evaporator 1, the hot gas valve 13 opens during operation, namely at the same time as heating of the supply air 21 is performed by the condenser 6, and warm hot-gas is sent through the bypass 28 directly to the evaporator 1, to thaw the same from inside. While no energy is supplied to the evaporator 1, the energy is subsequently consumed in the system and eventually the energy in the system consist only of compressor energy, if no new energy is supplied. But by instead open the hot gas valve 13 limited while increasing compressor 5 speed, the defrosting and the energy consumption is controlled and the temperature in the evaporator 1 is increases at the same time as heating energy is delivered to the condenser 6. Then it is possible to raise the temperature in the evaporator 1 to a level where the ice melts at the same time as the energy, for both defrosting and for heating of the supply air 21, is enough. In addition, defrosting of the evaporator 1 is further accelerated by lowering the speed of rotating heat recovery 10 so the exhaust air 18 temperature T1, between the rotor and the evaporator 1 increases, and defrosting is thereby performed both from outside and inside. By the reservoir 14 together with the first and second expansion valve 7, 15 the super-heating and the amount of refrigerant 4 in the system is constantly balanced, for optimal operation. Preferably, the two expansion valves 7, 15 and the hot gas valve 13 are electronically controlled. The first expansion valve 7 together with the electronic hot gas valve 13, is balancing the relationship between hot gas bypass and flow of refrigerant over the evaporator 1, while the second expansion valve 15 is balancing the flow of refrigerant over the condenser 6.

Figure 3:
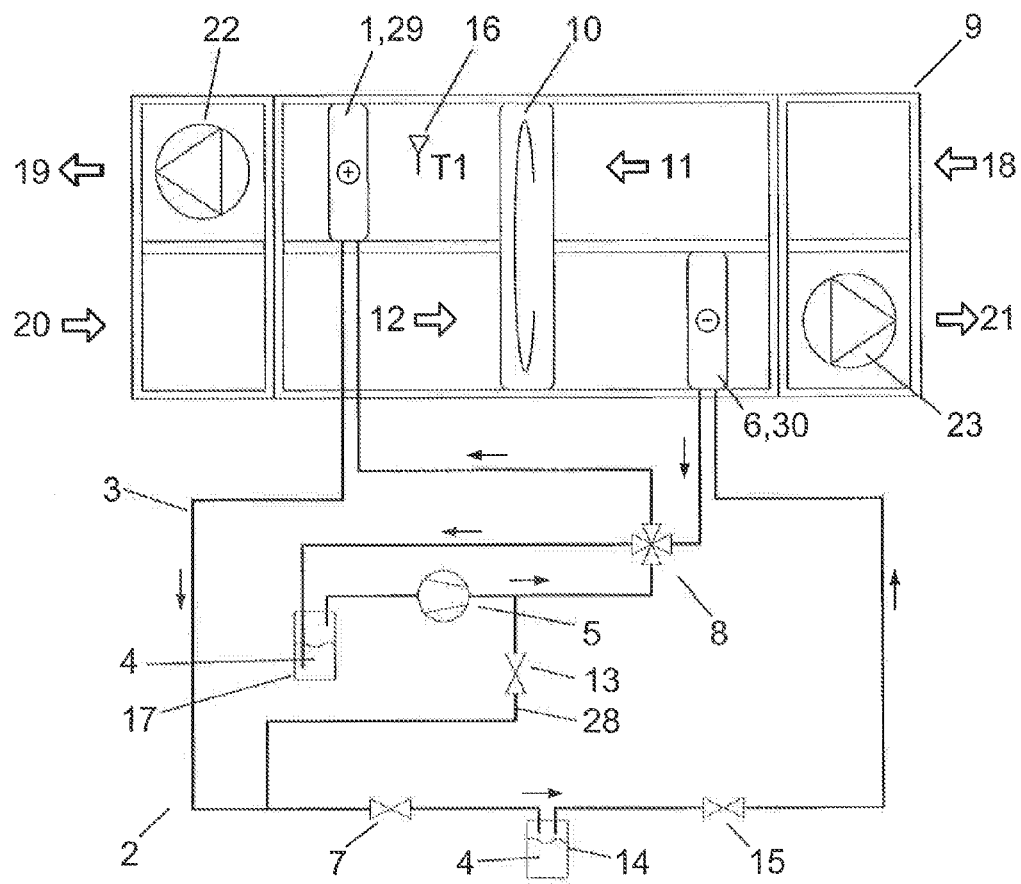
FIG. 3 shows a principal layout of the heat pump according to the invention during reversible operation for defrost of the evaporator. In principle, the figure also shows cooling mode while a cooling need is at hand.

FIG. 3 shows a principal layout of the heat pump 2 according to the invention, during reversible operation for defrosting of the evaporator 1. Principally, the figure also shows cooling mode when cooling demand is at hand. Just like for conventional heat pumps it is fully possible to run the heat pump 2 reversed for defrosting of the evaporator 1. By indication of icing in the evaporator 1 the four-way valve 8 switches for reversible operation and sends the warm hot-gas/refrigerant 4 directly to the evaporator 1, i.e. the first DX-coil 29 positioned in the first air stream 11. Thus the first DX-coil 29 is heated from the inside and because of that the cooling power is reduced in the evaporator 1/the first DX-coil 29, the passing exhaust air 18/extract air 19 gets warmer, and double-sided defrosting of the evaporator 1/the first DX-coil 29 occurs. This can preferably be combined with simultaneously down-regulating the speed of the rotating heat recovery device 10. This provides a more rapid progression of the defrosting sequence. By this method the first DX-coil 29, i.e. the evaporator 1 of the heating mode, positioned in the first air stream 11, will be heated. The second DX-coil 30 is however cooled down during the reversible operation whereby the supply air 21 will be cooled. This may constitute a disadvantage when the supply air temperature can be too cold for the supply to premises. This of course depends on what type of premises the air handling unit 9 serves, but usually one tries to minimize fluctuation between cool and warm supply air 21. Here through it becomes most important that the defrosting of the evaporator 1/the first DX-coil 29 is quick, and this is solved by the double-sided defrosting method according to the invention.

Cooling Operation

During times when cooling is required primarily the heat recovery device 10 is fully used to recover cooling from the exhaust air 18, if the exhaust air 18 is colder than the outdoor air 20, and cool down the supply air 21. According to the example in FIG. 3 the controllable rotating heat recovery device 10 runs with maximum speed for maximal cooling recovery. The four-way valve 8 has switched the flow direction of the refrigerant 4 to reversible operation, in this case for cooling operation. The compressor 5 regulates towards the preset value of the supply air 21 and the cooling power of the refrigerant circuit is depending on the speed of the compressor 5. From the second DX-coil cooling is now released to the supply air 21 while the condenser heat and the compressor heat are released in the first DX-coil 29 and follows the extract air 19 out in the free. At cooling operation the first DX-coil 29 constitutes condenser 6, and the second DX-coil 30 thus evaporator 1. During cooling the hot gas valve 13 is completely shut, while the first expansion valve 7 is completely open and the second expansion valve 15 controls the flow of refrigerant 4 over the second DX-coil 30 and regulates towards the preset value for superheat. For optimal cooling the superheat is preferably around 4-8 K.

COMPONENT LIST

1=evaporator
2=heat pump
3=refrigerant system

4=refrigerant
5=compressor
6=condenser
7=first expansion valve
8=four-way valve
9=air handling unit
10=heat recovery device
11=first air stream
12=second air stream
13=hot gas valve
14=reservoir
15=second expansion valve
16=temperature sensor
17=flash tank
18=exhaust air
19=extract air
20=outdoor air
21=supply air
22=exhaust fan
23=supply fan
24=first inlet
25=first outlet
26=second outlet
27=second inlet
28=bypass
29=first DX-coil
30=second DX-coil

The invention claimed is:

1. A method of defrosting of an evaporator (1) in a heat pump (2), which the heat pump (2) comprises a refrigerant system (3) with a refrigerant (4) and in a flow direction of the refrigerant are arranged at least one compressor (5), at least one condenser (6), at least one first expansion valve (7) and at least one evaporator (1), and further the heat pump (2) comprises at least one four-way valve (8) which is arranged in the flow direction of the refrigerant after the compressor (5) and before the condenser (6), and further the four-way valve (8) is arranged to shift the flow direction of the refrigerant (4) in the refrigerant system (3) for reversible operation such that, in the reversible operation, the refrigerant (4) flows from the four-way valve to the evaporator (1) instead of the condenser (6) without passing through the expansion valve (7), and further the heat pump (2) is arranged in connection to an air handling unit (9), which air handling unit (9) comprises a controllable heat recovery device (10) arranged to recover energy from a first air stream (11) and transfer the recovered energy to a second air stream (12), and the evaporator (1) is arranged in the first air stream (11), in a flow direction of the first air stream after the heat recovery device (10), and the condenser (6) is arranged in the second air stream (12), in a flow direction of the second air stream after the heat recovery device (10), the method comprising the steps of:
when frost formation occurs in the evaporator (1), increasing the temperature of the refrigerant (4) through the evaporator (1) simultaneously as the heat recovery device is regulated down and the heat recovery is decreased, and
accomplishing a simultaneously heating of the evaporator (1), both from inside by the increased temperature of the refrigerant (4), and from the outside by the passing first air stream (11), wherein the first air stream temperature increases when the heat recovery is decreased, and thereby the evaporator (1) is defrosted.

2. The method according to claim 1, wherein the temperature raise of the refrigerant (4) at defrosting is accomplished by that the heat pump (2) runs reversible by that the four-way valve (8) shifts the flow direction of the refrigerant (4) in the refrigerant system (3) so that the heated refrigerant (4) is sent to the evaporator (1) instead of to the condenser (6).

3. The method according to claim 1, wherein the temperature raise of the refrigerant (4) at defrosting is accomplished by that the heat pump (2) comprises a hot gas valve (13) which is arranged in the flow direction of the refrigerant after compressor (5), and where the hot gas valve (13) partially or fully opens during operation and thereby directs a portion of heated refrigerant (4) directly to the evaporator (1) without the refrigerant (4) passing the first expansion valve (7), simultaneously as a remaining portion of the refrigerant (4) is sent to the condenser (6).

4. The method according to claim 3, further comprising the step of simultaneously increasing a speed of the compressor (5) as the hot gas valve (13) partially or fully opens.

5. The method according to claim 1, wherein the temperature raise of the refrigerant (4) at defrosting is accomplished by that the cooling power of the evaporator (1) is decreased by reducing the compressor (5) speed.

6. The method according to claim 1, further comprising the step of measuring the temperature (T1), between the heat recovery device (10) and evaporator (1), and when frost formation occurs in the evaporator (1), defrosting the evaporator based on the temperature (T1).

7. The method according to claim 1, wherein the heat pump (2) further comprises a reservoir (14) and a second expansion valve (15), which are arranged in the flow direction of the refrigerant between the first expansion valve (7) and the condenser (6), and the first expansion valve (7) controls a refrigerant (4) flow over the evaporator (1) and the second expansion valve (15) controls the refrigerant (4) level in the reservoir (14) in interaction with the first expansion valve (7), to obtain a controlled amount of refrigerant (4) and balanced counter pressure in the condenser (6) at a partial load of the compressor (5).

8. The method according to claim 7, further comprising the step of achieving the defrosting by raising a super heat above a normal operation set point by reducing a speed of the compressor (5) and simultaneously throttling the first expansion valve (7), and decreasing the cooling power of the evaporator (1).

9. A device for defrosting of an evaporator (1) in a heat pump (2), which heat pump (2) comprises a refrigerant system (3) with a refrigerant (4) and in a flow direction of the refrigerant are arranged at least one compressor (5), at least one condenser (6), at least one first expansion valve (7) and at least one evaporator (1), and further the heat pump (2) comprises at least one four-way valve (8) which is arranged in the flow direction of the refrigerant after the compressor (5) and before the condenser (6), and further the four-way valve (8) is arranged to shift the flow direction of the refrigerant (4) in the refrigerant system (3) for reversible operation, whereby, in reversible operation, the refrigerant (4) flows from the four-way valve to the evaporator (1) instead of the condenser (6) without passing the expansion valve (7), and further the heat pump (2) is arranged in connection to an air handling unit (9), which air handling unit (9) comprises a controllable heat recovery device (10), arranged to recover energy from a first air stream (11) and transfer the recovered energy to a second air stream (12), and the evaporator (1) is arranged in the first air stream (11), in a flow direction of the first air stream after the heat recovery device (10), and the condenser (6) is arranged in the second air stream (12), in a flow direction of the second air stream after the heat recovery device (10), and the heat pump (2) comprises a hot gas valve (13), which is arranged after the compressor (5), in the flow direction of the refrigerant (4), and the hot gas valve (13) is arranged to partially or fully open during operation and thereby direct a portion of heated refrigerant (4) directly to the evaporator (1) without the refrigerant (4) passing the first expansion valve (7), simultaneously as a remaining portion of the refrigerant (4) is sent to the condenser (6), wherein the heat pump (2) comprises a reservoir (14) and a second expansion valve (15), which are arranged between the first expansion valve (7) and the condenser (6), and the first expansion valve (7) is arranged to control a refrigerant (4) flow over the evaporator (1) and the second expansion valve (15) is arranged to control refrigerant (4) level in the reservoir (14) in interaction with the first expansion valve (7), to obtain a controlled amount of the refrigerant (4) and balanced counter pressure in the condenser (6) at a partial load of the compressor (5).

* * * * *